Figure 1:
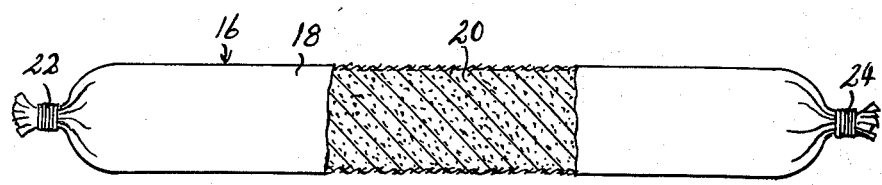

United States Patent
Frank

[11] 3,958,357
[45] May 25, 1976

[54] FISH BAIT PACKAGE

[76] Inventor: Robert Frank, Rte. 3, Box 182, Shawnee Mission, Kans. 66209

[22] Filed: Feb. 24, 1975

[21] Appl. No.: 552,242

[52] U.S. Cl. .............................................. 43/42.06
[51] Int. Cl.² ........................................ A01K 85/00
[58] Field of Search ........... 43/42.06, 41, 42, 42.24; 426/1

[56] References Cited
UNITED STATES PATENTS

| 862,150 | 8/1907 | Fredricks | 43/41 |
| 871,935 | 11/1907 | Henzel | 43/42.06 |
| 2,780,021 | 2/1957 | Fagg | 43/41 |
| 2,869,279 | 1/1959 | Pretorius | 43/42.06 |
| 3,047,975 | 8/1962 | Pretorius | 43/42.06 |
| 3,505,755 | 4/1970 | Pearce | 43/42.06 |
| 3,854,234 | 12/1974 | Hardin | 43/42.06 |

Primary Examiner—Warner H. Camp
Attorney, Agent, or Firm—John A. Hamilton

[57] ABSTRACT

A package for fish bait of the odor type commonly known as "dough bait" consisting of a hollow cylindrical tube of foraminous material adapted to contain the bait, and secured closed at both ends, said tube being adapted to be threaded over the point of a fishhook. The means securing at least one end of said tube may consist of a resiliently yieldable binding, whereby when the hook is inserted through said binding, it assists in securing and retaining the package on the hook.

2 Claims, 3 Drawing Figures

FISH BAIT PACKAGE

This invention relates to new and useful improvements in the use and packaging of prepared fish baits, having particular application to fish baits of a moldable, doughy consistency including therein material or chemical odor ingredients which are disseminated in fishing waters when submerged, as a means of attracting fish to a hook on which the bait is attached, such baits being commonly known as "dough bait", and being available in a wide variety of odors, both natural and synthetic.

Such baits are in extremely widespread usage, but their use has heretofore been subject to certain well known difficulties and inconveniences. For example, such baits are usually sold in bulk in jars, cans or the like, and the fisherman uses it by extracting a quantity thereof from the container with his fingers, molding it into a lump of the desired shape between his palms and fingers, and mounting it on a fishhook by inserting said hook therethrough. The odors used for such baits thus are applied to his hands, and said odors, though attractive to fish, are often disagreeable or even highly offensive to humans, so that the process is inconvenient, messy and unpleasant. The fisherman, unless highly experienced, is also not likely to know whether he has used the correct amount of bait, or on the other hand an inadequately small amount or wastefully excessive amount. Also, once the bait is in the water, slowly dissolving or disintegrating in said water to release and disseminate its odor ingredients at a rate controlled by its formulation, it may easily fall from the hook and be wasted in many cases. It of course can and must gradually dissolve or disintegrate in the water to release its odor, but may fall away in chunks, particularly if the lump of bait was not thoroughly kneaded to a fully heterogeneous mass, but was left with "division lines" into which water can easily penetrate. Such baits are commonly supplied with a fibrous filler material, such as cotton fiber, designed to prevent this occurrence, but such filler material is only partially effective at best. For example, if the bait lump was inadequately kneaded to leave division lines therein as described above, there usually will be no fibers extending across the divisions to hold the lump together in an integrated mass. Finally, it has been found that many fish are quite capable of nibbling or "sucking" the bait off the hook without taking the hook point in their mouths, since it may easily be removed in small pieces.

Accordingly, the primary object of the present invention is the provision of a package for this type of bait which solves all of the above enumerated difficulties and inconveniences, in that it virtually eliminates all direct contact between the bait and the fisherman's hands, provides automatically for accurate measurement of the amount of bait to be used, keeps the bait directly adjacent the hook even though it should disintegrate in the water, and prevents fish from nibbling, sucking, or otherwise breaking the bait free of the hook.

Generally, these objects are accomplished by the provision of a bait package comprising a body member of foraminous or otherwise highly water-permeable material, into which a carefully measured amount of dough bait is inserted and sealed by the bait manufacturer, and which the fisherman may apply directly to the fishhook, the foramina of the body member permitting free circulation of water therethrough for dissemination of the odor ingredients of the bait. The body member is preferably flexible and elongated, in order that it can be threaded onto a fishhook in such a manner to camouflage and conceal said hook from the fish. The ends of the body member are sealed to retain the bait therein, and preferably the sealing means at at least one end thereof is resiliently yieldable to an extent sufficient to permit the insertion of the fishhook therethrough, whereafter it grips the hook resiliently to further secure the package on the hook.

Other objects are simplicity and economy of construction, efficiency and dependability of operation, and ready adaptability for manufacture by mass production methods.

Figure 2:
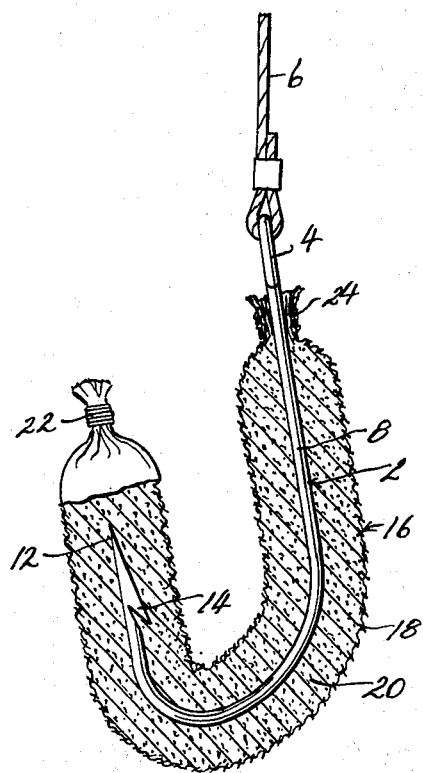
Figure 3:
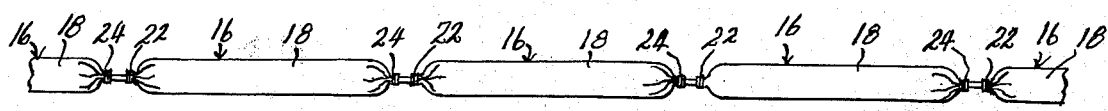

With these objects in view, as well as other objects which will appear in the course of the specification, reference will be had to the accompanying drawing, wherein:

FIG. 1 is a side elevational view, to an enlarged scale, of a fish bait package embodying the present invention, FIG. 2 is a sectional view of the package shown operatively applied to a fishhook, and FIG. 3 is a side elevational view, to a reduced scale, of a plurality of the packages at an intermediate stage in their production.

Like reference numerals apply to similar parts throughout the several views, and the numeral 2 applies to a fishhook of ordinary design including a length of wire having an eye 4 formed at one end thereof adapted to be connected, for example, to a fishing line or leader 6. Extending from eye 4 is a shank portion 8, at the opposite end of which the wire is rebent in a bight portion 10 terminating in a sharp point 12 and barb 14.

The fish bait package forming the subject matter of the present invention is indicated generally by the numeral 16, and is of course adapted to be mounted on the fishhook described. As best shown in FIG. 1, said package comprises an elongated tubular body member 18 formed of a pliable material which is foraminious or otherwise highly permeable to water, such as fabric netting or other suitable material. It is adapted to be filled with a fish bait material 20 of a "dough" type, which it will be understood includes odor producing constituents which will be disseminated in any water in which the bait is immersed, at a rate determined by its rate of dissolution and disintegration in said water. Bait materials of this type, capable of disseminating many different odors attractive to many different species of fish, are common and well known in the art, and their specific chemical and physical make-up need not be described here in detail.

The respective ends of the tubular body member 18 are gathered closed, after the bait material is inserted, and secured closed by any suitable means. As shown, the body member ends are closed by bindings 22 and 24 of thread or the like, wrapped tightly and secured about the gathered end portions of the body member. FIG. 3 illustrates a method of production in which the bait material 20 may be introduced continuously into a body member 18 of indetermately long length, which may then be tied off with pairs of bindings 22 and 24 closely spaced apart at selected intervals along the length of the body member, which is then cut between closely adjacent binding pairs 22 and 24 to sever it into individual packages, in which form the bait would ordinarily be merchandised. For reasons which will presently appear, it is preferred that the binding at at least one end of the package, say binding 24, be formed of thread which is at least slightly elastically yieldable, or otherwise accomplished in such a manner that that end of the body member may be resiliently expanded or opened to admit the fishhook, as will be described.

In use, the package 16 is applied to fishhook 2 by piercing it with said hook. Then, when the hook and package are immersed in water, said water will circulate freely through the package to cause dissolution or disintegration of the bait material 20, and dissemination of its odor producing ingredients throughout adjacent waters. The package way of course be applied to the hook in any desired attitude, since all portions of the package are easily penetrated by the hook. Preferably, however, the package is mounted on the hook by first introducing the point 12 of the hook through elastic binding 24 at one end of the package, coaxially therewith, and pushing the package onto the hook, guiding it along the wire forming the hook, around bight 10 and along shank 8 to a point adjacent eye 4, the hook and package then having the relative positions shown in FIG. 2. This disposition of the package has the advantage of camouflaging the hook from the fish, many of which appear to be rather uncannily adept in avoiding exposed hooks. The package tends to be secured on the hook by its curvature around the bight 10 of the hook, and the mounting is further secured by the resilient expansion of binding 24, which provides a frictional grip on hook shank 8. The point of the hook could be left slightly exposed exteriorly of the package if desired, but this is not necessary, and the hook point may be left embedded in the package as shown in FIG. 2, since if a fish strikes at the bait, the hook point will be easily forced outwardly of the package and will enter the fish's mouth. If only binding 24 is made elastic, not binding 22, then the bindings may be of different colors to indicate to the fisherman the end of the package through which the hook should be inserted. If both bindings are elastic, the hook may of course be inserted from either end.

Thus it will be apparent that a fish bait package having several advantages has been provided. It requires very little handling of bait material 20 itself by the fisherman, so that his hands are not likely to become badly coated with possibly foul-smelling or sticky substances. If the bait material is reasonably dry, very little of the bait material will penetrate the body member to his hands as he applies the package to the hook. It permits accurate pre-measurement of the bait material so that an adequate but not excessive amount of material is used. The amount of bait material required will be determined by several factors, such as the nature and formulation of the material itself which govern the length of time it will remain effective once in the water, the type of fish being sought, and the size of the hook.

The amount of bait material will in turn determine the desired dimensions of the package, keeping in mind that the package is preferably long enough to camouflage nearly the entire length of the hook wire. The package also retains the bait material securely at or adjacent the hook, so that it cannot be nibbled or sucked from the hook by the fish, and will not be washed away in large pieces or at excessive rates by water erosion or water currents. In connection with the latter point, the package solves problems encountered by dough bait manufacturers of so formulating the material, or impregnating it with fibrous binding material, in order to make it sufficiently cohesive to maintain itself on a fishhook when it is immersed in water. The present package in effect supplies the "cohesion", preventing escape of all particles except those small enough to pass through the foramina of body member 18. This particle size may be as small as desired, by utilizing finely woven cloth or even certain types of filter "paper" for the body member. Said body member may be of any desired cross-sectional contour, but is preferably round or circular.

While I have shown and described a specific embodiment of my invention, it will be readily apparent that many minor changes of structure and operation could be made without departing from the spirit of the invention.

What I claim as new and desire to protect by Letters Patent is:

1. A fish bait package comprising a hollow body member formed of a foraminous material and containing a fish bait of a water soluble dough type including odor producing ingredients, said package being adapted to be mounted on a fishhook, whereby when said fishhook and package are immersed in water, water will enter and circulate in said body member through the foramina thereof to dissolve said bait material and release the odor producing ingredients thereof, said body member being formed of a material easily penetrated by the point of a fishhook, whereby said package may be mounted on said hook by inserting the point of said hook therethrough, said body member being of slender, elongated form and being transversely flexible, whereby it may be configurated to extend along and enclose a substantial portion of the length of the wire of which said fishhook is formed, thereby camouflaging said fishhook, said body member including a portion formed of strongly elastic material through which the point of said fishhook may be inserted inwardly until said elastic portion engages a portion of the hook wire remote from said point, elastic contraction of said elastic portion then gripping said wire frictionally to secure said package on said fishhook.

2. A fish bait package as recited in claim 1 wherein said body member comprises an elongated tubular length of flexible, foraminous material, and binding means closing each end of said tubular member, the binding means at at least one end of said tubular member being resiliently expansible to permit opening of that end of said tubular member, and constituting said elastic portion of said body member, whereby the point of a fishhook may be inserted axially into said tubular member by causing resilient yielding of said binding means.

* * * * *